US012528675B2

(12) United States Patent
Schuster et al.

(10) Patent No.: US 12,528,675 B2
(45) Date of Patent: Jan. 20, 2026

(54) LOCKING HEAD

(71) Applicant: LIEBHERR-COMPONENTS KIRCHDORF GMBH, Kirchdorf (DE)

(72) Inventors: Markus Schuster, Ottobeuren (DE); Jürgen Bopp, Ummendorf (DE); Hans-Peter Lavergne, Trunkelsberg (DE)

(73) Assignee: LIEBHERR-COMPONENTS KIRCHDORF GMBH, Kirchdorf (DE)

(*) Notice: Subject to any disclaimer, the term of this patent is extended or adjusted under 35 U.S.C. 154(b) by 36 days.

(21) Appl. No.: 18/292,305

(22) PCT Filed: Jul. 21, 2022

(86) PCT No.: PCT/EP2022/070533
§ 371 (c)(1),
(2) Date: Jan. 25, 2024

(87) PCT Pub. No.: WO2023/006583
PCT Pub. Date: Feb. 2, 2023

(65) Prior Publication Data
US 2024/0217786 A1 Jul. 4, 2024

(30) Foreign Application Priority Data
Jul. 28, 2021 (DE) ..................... 10 2021 119 612.4

(51) Int. Cl.
*B66C 23/70* (2006.01)

(52) U.S. Cl.
CPC .................................. *B66C 23/708* (2013.01)

(58) Field of Classification Search
CPC .............................. B66C 23/708; F16H 25/20
USPC .......................................................... 74/89.33
See application file for complete search history.

(56) References Cited

U.S. PATENT DOCUMENTS

| | | | | |
|---|---|---|---|---|
| 10,604,386 B2 * | 3/2020 | Kawabuchi | ............. | B66C 23/54 |
| 2015/0128735 A1 | 5/2015 | Klein et al. | | |
| 2022/0169484 A1 | 6/2022 | Zushi et al. | | |

FOREIGN PATENT DOCUMENTS

| | | |
|---|---|---|
| DE | 10164600 A1 | 7/2003 |
| DE | 202013010381 U1 | 11/2013 |
| DE | 202014002187 U1 | 6/2014 |
| DE | 202015101045 U1 | 4/2015 |
| GB | 2053149 A | 2/1981 |

(Continued)

OTHER PUBLICATIONS

ISA European Patent Office, International Search Report Issued in Application No. PCT/EP2022/070533, Nov. 23, 2022, WIPO, 6 pages.

*Primary Examiner* — Gregory Robert Weber
(74) *Attorney, Agent, or Firm* — McCoy Russell LLP

(57) ABSTRACT

The present invention relates to a locking head for telescoping cylinders of a telescopic boom, which has a plurality of telescopic boom portions, and a housing which comprises at least one bolt-like cylinder locking body, which can be moved in and out of the housing in order to lock the locking head with a telescopic boom portion, and at least one bolt-like telescope locking body, which can be moved in and out of the housing in order to release the telescopic boom portion for a telescoping movement. The locking head has at least one electric actuator which is designed to actuate the at least one cylinder locking body and/or the at least one telescope locking body.

16 Claims, 1 Drawing Sheet

(56) References Cited

FOREIGN PATENT DOCUMENTS

| | | | | |
|---|---|---|---|---|
| JP | 2017159973 | A | * | 9/2017 |
| WO | 2020204153 | A1 | | 10/2020 |

* cited by examiner

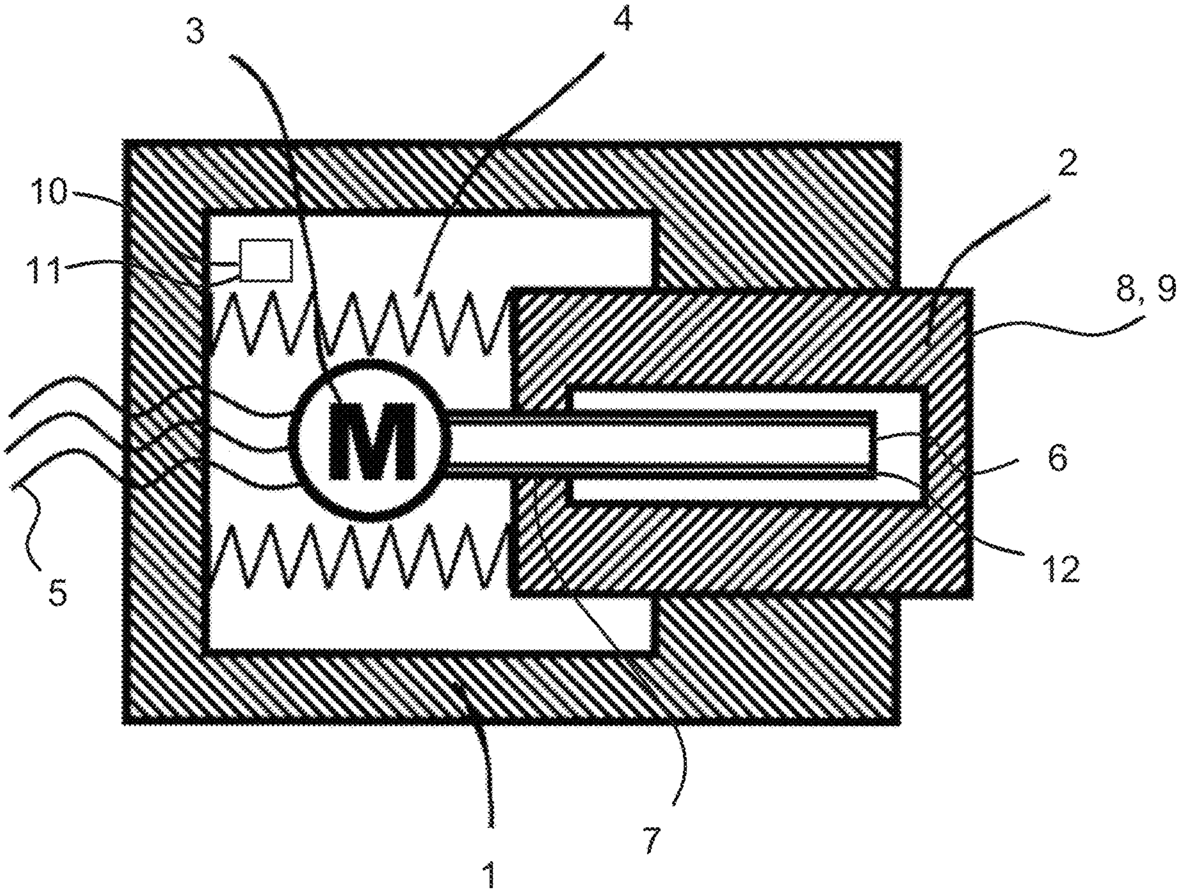
3
4
2
10
11
8, 9
M
6
12
5
7
1

LOCKING HEAD

CROSS REFERENCE TO RELATED APPLICATIONS

The present application is a U.S. National Phase of International Application No. PCT/EP2022/070533 entitled “LOCKING HEAD,” and filed on Jul. 21, 2022. International Application No. PCT/EP2022/070533 claims priority to German Patent Application No. 10 2021 119 612.4 filed on Jul. 28, 2021. The entire contents of each of the above-listed applications are hereby incorporated by reference for all purposes.

TECHNICAL FIELD

The present invention relates to a locking head for telescoping telescopic booms in and out, which can be used, for example, in telescopic boom cranes. Such locking heads typically have a yoke which releases a locking bolt in the telescopic boom by means of hydraulic actuation, so that the telescopic boom or a telescopic boom portion of the telescopic boom is unlocked and can thus be moved.

BACKGROUND AND SUMMARY

The individual telescopic portions of a mobile boom are extended one after the other with the aid of a telescoping cylinder and locked together in the extended position. This requires a locking mechanism that can be locked and unlocked in different positions.

Before a telescopic portion can be moved, it must be coupled with the locking head. For this purpose, two corresponding locks are displaced (cylinder locking bodies), which engage with the telescopic portion. The telescopic portion that is still coupled to the neighbouring telescopic portion is then unlocked by activating a corresponding unlocking mechanism. It is known from the prior art that a spring-loaded bolt is pulled by means of hydraulic actuation of a telescope locking body so that the telescopic portion engaging with the locking head can be extended. As a result, it is now possible for the locking head to move the telescopic portion by means of the telescoping cylinder so that the internal telescopic portion is extended. In the extended position, the telescopic portion must first be locked again with the neighbouring telescopic portion. To do this, the corresponding unlocking claw (actuated by at least one telescope locking body) must be returned to its starting position so that the telescopic portion that has just been extended is firmly connected to a neighbouring telescopic portion. Only when the two neighbouring telescopic portions are locked together may the cylinder locks between the locking head and the (currently extended) telescopic portion be released again. The telescoping cylinder then retracts again in order to move another telescopic portion that has not yet been extended in the manner described above.

The cylinder locking body or telescope locking body is actuated using a hydraulic system that moves the corresponding bodies into the desired position. A spring element can also be used to extend or retract so that the respective bodies are retracted or extended back into the locking head when the hydraulic pressure decreases.

DE 20 2015 101 045 U1 discloses a locking head known from the prior art, the locking bodies of which can be moved in position using hydraulics.

A disadvantage of such a locking head known from the prior art is that the locking head arranged at the movable end of a telescoping cylinder must have various hydraulic lines which must be able to actuate the telescope locking body or the cylinder locking body accordingly.

It is the object of the present invention to provide a locking head which is lighter than the implementations known from the prior art and which enables more economical operation.

This is achieved with a locking head which has the features as described herein.

The locking head according to the invention for telescoping cylinders of a telescopic boom, which has a plurality of telescopic boom portions, comprises a housing which comprises at least one bolt-like cylinder locking body, which can be moved in and out of the housing in order to lock the locking head with a telescopic boom portion, and at least one bolt-like telescope locking body, which can be moved in and out of the housing in order to release the telescopic boom portion for a telescoping movement. The locking head is characterised by at least one electric actuator which is designed to actuate the at least one cylinder locking body and/or the at least one telescope locking body.

Providing an electric actuator eliminates the need to run hydraulic lines to the locking head, which are required for actuating the cylinder locking body or telescope locking body. This makes the overall system cheaper and lighter, which is an advantage in particular with regard to the consistent endeavour to use lighter components.

According to a further development of the invention, it can be provided that both the at least one cylinder locking body and the at least one telescope locking body are provided with a respective electric actuator.

It is not necessarily the case that the cylinder locking body and the telescope locking body are driven by the same electric actuator, for example an electric motor. It would be conceivable here that only a type of clutch transmits the force generated by the motor to the telescope locking body in a first case and to the cylinder locking body in a second case, so that the two locking bodies can be actuated one after the other. As explained, the at least one cylinder locking body and the at least one telescope locking body can each have their own electric actuator, so that it is also possible for the two different locking bodies to be actuated one after the other.

According to an optional modification of the present invention, it can further be provided that the locking head is further provided with a spring element which forces the at least one cylinder locking body and/or the at least one telescope locking body in the extension or retraction direction.

Accordingly, the electric actuator can only be used to retract the cylinder locking body or the telescope locking body, so that a state in which the at least one cylinder locking body is retracted (and thus couples with a telescopic portion) only occurs if this is actively realised by energising the electric actuator. The situation is similar for the at least one telescope locking body, the retracted state of which (in which a coupling of a telescopic portion with a neighbouring telescopic portion no longer exists) can also only be actively converted by energising the electric actuator. If there is a malfunction in the electric actuator, the spring element ensures that the telescope locking body or the cylinder locking body remains permanently in the position with the lowest risk potential.

It can also be provided that the locking head is further provided with a magnet element, in particular an electromagnet element which forces the at least one cylinder locking body and/or the at least one telescope locking body in the extension or retraction direction.

It can therefore be provided that the magnet element is designed to urge the cylinder locking body or the telescope locking body in the extension or retraction direction.

Alternatively or additionally, according to the invention it can further be provided that the at least one electric actuator is designed to move the at least one cylinder locking body and/or the at least one telescope locking body in the retraction or extension direction. Typically, it can also be provided that, if a spring element or a magnet element is provided, the electric actuator can only move the telescope locking body or the cylinder locking body in the direction that is opposite to the force exerted by the spring element or the magnet element.

In addition, it can therefore be provided that the element for forcing in the extension direction is designed to move the locking body outwards even if the electric actuator fails and/or is not supplied with electrical power.

This ensures that even in the event of a malfunction of the electric actuator, for example, the telescope locking body remains in its extended position so that a telescopic portion is not unlocked by a neighbouring telescopic portion.

Furthermore, it can therefore also be provided that the element for forcing in the retraction direction is designed to move the locking body outwards even if the electric actuator fails and/or is not supplied with electrical power.

This ensures that even in the event of a malfunction of the electric actuator, for example, the cylinder locking body remains in its retracted position so that the locking head does not come loose from a telescopic portion.

According to a further variant of the invention, it can be provided that a hydraulic drive is not used to move the at least one cylinder locking body and/or the at least one telescope locking body.

Only the force generated by the electric actuator is used to actuate the cylinder locking body or the telescope locking body, wherein movement in the opposite direction can of course also be generated by the spring element or the magnet element. The important thing here is that no hydraulic drive is required for movement, so that the technology previously used in the prior art is no longer used and the associated disadvantages have been overcome.

According to an optional further development of the invention, it can further be provided that the at least one cylinder locking body and the at least one telescope locking body have a thread for engaging with a spindle drive by the electric actuator. The thread can run along an outer circumference of the locking body, but can also be provided on an inner circumference of a blind hole. It can also be provided that the electric actuator rotates an output shaft (e.g. a spindle) via a gearbox or directly, which ensures a translational displacement of the locking body by engaging with the thread on the locking body.

It can further be provided according to the invention that both at least one cylinder locking body and at least one telescope locking body are provided, the respective axes of movement of which are not parallel to each other, preferably perpendicular to each other.

In a locking head, the angle between the axes of movement of a cylinder locking body and a telescope locking body is typically 90°, so that the different locking bodies have axes of movement that are perpendicular to each other.

It can further be provided that at least two cylinder locking bodies are provided, the respective axes of movement of which are parallel to each other, preferably identical to each other.

The at least two cylinder locking bodies are typically located on opposite sides of the housing of the locking head. If these two cylinder locking bodies are extended, they move away from each other. The direction of movement of the two cylinder locking bodies is therefore anti-parallel, but can lie on a common axis.

Furthermore, according to an optional modification of the present invention, it may be provided that at least two telescope locking bodies are provided, the respective axes of movement of which are parallel to each other.

The at least two telescope locking bodies are located on a common side of the housing of the locking head and have parallel axes of movement. It is common for the movement of the two telescope locking bodies to be roughly synchronised, as a type of clamp is typically attached between the two telescope locking bodies which grips an unlocking mechanism so that it is released when the two telescope locking bodies are retracted, and two adjacent telescopic portions are separated from each other.

The invention also relates to a telescoping cylinder having a locking head according to one of the variants discussed above.

It can be provided that only the electric actuator needs to be activated to actuate the at least one cylinder locking body and/or the at least one telescope locking body in the locking head, and preferably no hydraulic force is required.

BRIEF DESCRIPTION OF THE FIGURES

Further features, details and advantages of the invention can be seen in the following description of the FIGURE. In the drawings:

DETAILED DESCRIPTION

The figure shows a schematic sectional representation of a locking body as formed in the locking head according to the invention.

The figure does not show the entirety of a locking head, but only an isolated area of a locking body 2 and its arrangement for moving the locking body 2. It is clear to a person skilled in the art that both the cylinder locking body 8 and the telescope locking body 9 can be set in motion in the same way.

The locking body 2 is therefore mounted in the housing 1 and can either be moved into or out of it.

The basic structure is described below using the cylinder locking body 8 as an example.

It can be seen that the bolt-like cylinder locking body 8 is slidably mounted in the housing 1. The spring element 4 is designed in such a way that it forces the cylinder locking body 8 outwards into an extended position. It can also be provided that the locking head is further provided with a magnet element 10, in particular an electromagnet element 11 which forces the at least one cylinder locking body 8 and/or the at least one telescope locking body 9 in the extension or retraction direction. For movement in the opposite direction, i.e. inwards, an electric actuator 3 is provided which interacts with the cylinder locking body 8 by rotating a shaft 6, for example a spindle, and moves it inwards into the interior of the housing 1. For example, the cylinder locking body 8 can have a blind bore directed towards the electric actuator 3, which has a threaded area 12 on its inner circumference that meshes with a corresponding area of a shaft driven by the electric actuator 3.

It is clear to a person skilled in the art that a threaded area 12 can also be provided on the outer circumference of the cylinder locking body, which interacts with a corresponding spindle of the electric actuator 3.

The reference numeral 5 refers to the lines for activating and supplying power to the electric actuator 3, which have much more compact dimensions and a significantly lower weight than the hydraulic lines used conventionally. Although it is not absolutely necessary to arrange an electric actuator inside the locking head when using a hydraulic drive, the progressive miniaturisation of electrical components and actuators makes it possible to arrange them inside the locking head, so that the advantage of saving weight by omitting the hydraulic lines outweighs the disadvantage.

With a cylinder locking body 8, the spring element 4 is designed to force the cylinder locking body 8 outwards so that the cylinder locking body 2 remains in its extended position even in the event of a failure or other defect in the electric actuator 3.

The invention claimed is:

1. A locking head for telescoping cylinders of a telescopic boom having a plurality of telescopic boom portions, comprising:

a housing, at least one cylinder locking body, configured to move in and out of the housing in order to lock the locking head with a telescopic boom portion of the plurality of telescopic boom portions, at least one telescope locking body oriented perpendicular to the at least one cylinder locking body, the at least one telescope locking body configured to move in and out of the housing in order to release the telescopic boom portion of the plurality of telescopic boom portions for a telescoping movement, at least one electric actuator which is designed to actuate the at least one cylinder locking body and/or the at least one telescope locking body in a retraction direction towards an interior of the housing, and a spring element or a magnet element configured to exert a force outwards on the at least one cylinder locking body and/or the at least one telescope locking body in an extension direction, the extension direction opposite to the retraction direction.

2. The locking head according to claim 1, wherein the at least one electric actuator comprises a first electric actuator and a second electric actuator, wherein the first electric actuator actuates the at least one cylinder locking body and the second electric actuator actuates the at least one telescope locking body.

3. The locking head according to claim 1, comprising the spring element, wherein the spring element is configured to exert the force outwards on the at least one cylinder locking body and/or the at least one telescope locking body in the extension direction.

4. The locking head according to claim 3, wherein the spring element is designed to exert the force outwards on the at least one cylinder locking body even if the at least one electric actuator fails and/or is not supplied with electrical power.

5. The locking head according to claim 1, comprising the magnet element, wherein the magnet element is configured to exert the force outwards on the at least one cylinder locking body and/or the at least one telescope locking body in the extension direction.

6. The locking head according to claim 5, wherein the magnet element is an electromagnet element.

7. The locking head according to claim 1, wherein a hydraulic drive is not used to move the at least one cylinder locking body and/or the at least one telescope locking body.

8. The locking head according to claim 1, wherein the at least one cylinder locking body and the at least one telescope locking body each have a thread for engaging with a spindle drive by the at least one electric actuator.

9. The locking head according to claim 1, wherein respective axes of movement of the at least one cylinder locking body and the at least one telescope locking body are not parallel to each other.

10. The locking head according to claim 9, wherein at least two cylinder locking bodies are provided, and wherein respective axes of movement of the at least two cylinder locking bodies are parallel to each other.

11. The locking head according to claim 10, wherein the respective axes of movement are coaxial.

12. The locking head according to claim 9, wherein at least two telescope locking bodies are provided, and wherein respective axes of movement of the at least two telescope locking bodies are parallel to each other.

13. The locking head according to claim 9, wherein the respective axes of movement are perpendicular to each other.

14. A telescoping cylinder having the locking head according to claim 1.

15. The telescoping cylinder according to claim 14, wherein only the at least one electric actuator is activated to actuate the at least one cylinder locking body and/or the at least one telescope locking body in the locking head.

16. The telescoping cylinder according to claim 15, wherein actuating the at least one cylinder locking body and/or the at least one telescope locking body does not use hydraulic force.

* * * * *